(12) United States Patent
Bandic et al.

(10) Patent No.: US 8,537,481 B1
(45) Date of Patent: Sep. 17, 2013

(54) SHINGLED MAGNETIC RECORDING DISK DRIVE WITH MINIMIZATION OF THE EFFECT OF FAR TRACK ERASURE ON ADJACENT DATA BANDS

(75) Inventors: Zvonimir Z. Bandic, San Jose, CA (US); Cyril Guyot, San Jose, CA (US); Tomohiro Harayama, Sunnyvale, CA (US); Robert Eugeniu Mateescu, San Jose, CA (US); Shad Henry Thorstenson, Rochester, MN (US); Timothy Kohchih Tsai, Alviso, CA (US)

(73) Assignee: HGST Netherlands B.V., Amsterdam (NL)

( * ) Notice: Subject to any disclaimer, the term of this patent is extended or adjusted under 35 U.S.C. 154(b) by 34 days.

(21) Appl. No.: 13/423,177

(22) Filed: Mar. 17, 2012

(51) Int. Cl.
*G11B 27/36* (2006.01)
(52) U.S. Cl.
USPC ............... 360/31; 360/40; 360/48; 360/50; 360/51; 360/58

(58) Field of Classification Search
None
See application file for complete search history.

(56) References Cited

U.S. PATENT DOCUMENTS

| | | | |
|---|---|---|---|
| 5,600,500 A | 2/1997 | Madsen et al. | |
| 6,185,063 B1 | 2/2001 | Cameron | |
| 6,442,705 B1 | 8/2002 | Lamberts et al. | |
| 6,947,234 B2 | 9/2005 | Lamberts et al. | |
| 6,967,810 B2 | 11/2005 | Kasiraj et al. | |
| 7,227,708 B2 | 6/2007 | Feng | |
| 7,567,400 B2 | 7/2009 | Cheng | |
| 8,208,215 B2 * | 6/2012 | Molaro et al. | 360/71 |
| 8,385,162 B2 * | 2/2013 | Rosen et al. | 360/59 |
| 2006/0066971 A1 | 3/2006 | Alex et al. | |
| 2009/0091861 A1 | 4/2009 | Takano et al. | |
| 2009/0244775 A1 | 10/2009 | Ehrlich | |
| 2013/0142024 A1 * | 6/2013 | Sanvido et al. | 369/53.41 |

OTHER PUBLICATIONS

D. Guarisco et al., "A Fast and Accurate Method for Measuring Adjacent-Track Erasure", IEEE Transactions on Magnetics, vol. 42, No. 12, Dec. 2006, pp. 3868-3873.
Li et al., "Adjacent Track Erasure Analysis and Modeling at High Track Density", IEEE Transactions on Magnetics, vol. 39, No. 5, Sep. 2003, pp. 2627-2629.
Y. Liu et al., "Characterization of Skip or Far Track Erasure in a Side Shield Design", IEEE Transactions on Magnetics, vol. 45, No. 10, Oct. 2009, pp. 3660-3663.

(Continued)

*Primary Examiner* — Muhammad N Edun
(74) *Attorney, Agent, or Firm* — Thomas R. Berthold

(57) ABSTRACT

A shingled magnetic recording (SMR) hard disk drive (HDD) essentially eliminates the effect of far track erasure (FTE) in the boundary regions of annular data bands caused by writing in the boundary regions of adjacent annular data bands. The extent of the FTE effect is determined for each track within a range of tracks of the track being written. Based on the relative FTE effect for all the tracks in the range, a count increment (CI) table or a cumulative count increment (CCI) table is maintained for all the tracks in the range. For every writing to a track in a boundary region, a count for each track in an adjacent boundary region, or a cumulative count for the adjacent boundary region, is increased. When the count reaches a predetermined threshold the data is read from that band and rewritten to the same band.

15 Claims, 7 Drawing Sheets

(56) References Cited

OTHER PUBLICATIONS

Awerbuch, "Optimal distributed algorithms for minimum weight spanning tree, counting, leader election, and related problems", Proceedings of the nineteenth annual ACM symposium on Theory of computing, 1987, pp. 230-240.

Fern et al., "Boosting Lazy Decision Trees", Proceedings of the Twentieth International Conference on Machine Learning (ICML-2003), Washington DC, 2003, vol. 20; Part 1, pp. 178-185.

Friedman et al., "Lazy Decision Trees", Proceedings of the National Conference on Artificial Intelligence, 1996, No. 13//V1, pp. 717-724.

\* cited by examiner

| SDT # | Δlog (BER) | Count Increment (CI) | SDT # | Δlog (BER) | Count Increment (CI) |
|---|---|---|---|---|---|
| -16 | 0 | 0 | +16 | 0 | 0 |
| -15 | 0.5 | 0 | +15 | 0 | 0 |
| -14 | 0.75 | 1 | +14 | 0 | 0 |
| -13 | 1 | 2 | +13 | 0 | 0 |
| -12 | 2.5 | 56 | +12 | 0 | 0 |
| -11 | 2.3 | 35 | +11 | 0 | 0 |
| -10 | 2 | 18 | +10 | 0 | 0 |
| -9 | 1.75 | 10 | +9 | 0 | 0 |
| -8 | 0 | 0 | +8 | 0 | 0 |
| -7 | 0 | 0 | +7 | 0 | 0 |
| -6 | 0.25 | 0 | +6 | 0 | 0 |
| -5 | 0.28 | 0 | +5 | 0 | 0 |
| -4 | 0.28 | 0 | +4 | 0 | 0 |
| -3 | 0.25 | 0 | +3 | 0 | 0 |
| -2 | 0.2 | 0 | +2 | 0.25 | 0 |
| -1 | 0.75 | 1 | +1 | 1.3 | 4 |

FIG. 4

CCI Table

| SDT# | CI |
|---|---|
| +8 | 0 |
| +7 | 0 |
| +6 | 1 |
| +5 | 22 |
| +4 | 34 |
| +3 | 39 |
| +2 | 42 |
| +1 | 42 |
| 0 | ✕ |
| -1 | 28 |
| -2 | 27 |
| -3 | 27 |
| -4 | 19 |
| -5 | 4 |
| -6 | 0 |
| -7 | 0 |
| -8 | 0 |

FIG. 6

SHINGLED MAGNETIC RECORDING DISK DRIVE WITH MINIMIZATION OF THE EFFECT OF FAR TRACK ERASURE ON ADJACENT DATA BANDS

RELATED APPLICATION

This application is related to application Ser. No. 13/423,178 filed Mar. 17, 2012 concurrently with this application and titled "SHINGLED MAGNETIC RECORDING DISK DRIVE WITH INTER-BAND DISK CACHE AND MINIMIZATION OF THE EFFECT OF FAR TRACK ERASURE ON ADJACENT DATA BANDS".

BACKGROUND OF THE INVENTION

1. Field of the Invention

This invention relates generally to magnetic recording hard disk drives (HDDs), and more particularly to a shingled magnetic recording (SMR) HDD that minimizes the effect of far track erasure (FTE) on data tracks in the boundary regions of data bands.

2. Description of the Related Art

Magnetic recording disk drives that use "shingle writing", also called "shingled recording" or "shingled magnetic recording" (SMR), have been proposed, for example as described in U.S. Pat. No. 6,185,063 B1 and U.S. Pat. No. 6,967,810 B2. In SMR, the write head, which is wider than the read head in the cross-track direction, writes magnetic transitions by making a plurality of consecutive circular paths that partially overlap. The non-overlapped portions of adjacent paths form the shingled data tracks, which are thus narrower than the width of the write head. The data is read back by the narrower read head. The narrower shingled data tracks thus allow for increased data density. The shingled data tracks are arranged on the disk as annular bands separated by annular inter-band gaps or guard bands.

The writing of data to an entire band may occur when new data from the host is stored in memory and then written to a band for the first time. It may also occur when a portion of the data in a band is modified, i.e., a "read-modify-write" operation in which all the corresponding data in a band is read and stored in memory, then a portion is modified with the host-provided new write data, and finally all the corresponding data is written data back to the band. The writing of data to an entire band or bands may also occur when a band or bands are "cleaned" or "de-fragmented" to reclaim free space, i.e., the data in one or more bands is read and stored in memory and then re-written to the same band or a new band.

A problem in both conventional HDDs and SMR HDDs is wide-area track erasure (WATER) or far track encroachment or erasure (FTE). The write field from the write head is wider than a data track so when the write head is writing to a track, the outer portions of the write field (called the fringe field) overlap onto tracks other than the track being written. Data degradation due to fringe fields is not limited to the tracks immediately adjacent the track being written, but can extend over a range of tracks relatively far from the track being written. This FTE is particularly noticeable with write heads that have side shields. FTE may not affect tracks symmetrically on both sides of the track being written. Tracks on one side may encounter more pronounced FTE effects due to the write head shield design or due to read-write head skew. FTE is described by Liu et al., "Characterization of Skip or Far Track Erasure in a Side Shield Design", IEEE TRANSACTIONS ON MAGNETICS, VOL. 45, NO. 10, OCTOBER 2009, pp. 3660-3663. U.S. application Ser. No. 12/831,391 filed Jul. 19, 2010, and assigned to the same assignee as this application, describes a conventional HDD where the effect of FTE is minimized by counting the number of writes, incrementing counters based on the known effect of FTE on each track within a range of the track being written, and then rewriting the data when a count reaches a predetermined threshold.

In a SMR disk drive, FTE can occur on the tracks in the boundary region of a band, i.e., those tracks near an inter-band gap, when data is written to tracks in the boundary region of an adjacent band. What is needed is a SMR HDD that counts the number of writes to the data tracks in the boundary regions of bands and then rewrites the data in adjacent bands to minimize the effect of FTE.

SUMMARY OF THE INVENTION

The invention relates to a SMR HDD that essentially eliminates the effect of FTE in the boundary regions of annular data bands caused by writing in the boundary regions of adjacent data bands. The extent of the FTE effect is determined for each track within a range of tracks of the track being written. In one implementation, based on the relative FTE effect for all the tracks in the range, a count increment (CI) is determined for each track. The CI values and their associated track numbers within the range may be stored as a table in memory. A counter is maintained for each track in each boundary region. For every writing to a track in a boundary region, a count for each track in an adjacent boundary region that is within a range of the track being written is increased by the associated CI value. When the count value for a track reaches a predetermined threshold the data is read from that band and rewritten to the same band. In another implementation of the invention, a single cumulative count is maintained for each boundary region of each band and the cumulative count is increased by a cumulative count increment (CCI) for each writing to a track in an adjacent boundary region. When the cumulative count value for a boundary region of a band reaches a predetermined threshold the data is read from that band and rewritten to the band. Because a HDD typically includes multiple disk surfaces, each with an associated read/write head, and because not all heads will have the same exact write profiles and thus not generate the same FTE effect, a CI table or CCI table can be developed for each head and its associated disk surface.

For a fuller understanding of the nature and advantages of the present invention, reference should be made to the following detailed description taken together with the accompanying figures.

BRIEF DESCRIPTION OF THE DRAWING

FIG. 4 is a table of track number, BER value, and calculated count increment for tracks within a range of tracks for the perpendicular write head that produced the BER data of FIG. 3.

FIG. 6 is a cumulative count increment (CCI) table for counting the effect of FTE on a band boundary region using a single counter.

DETAILED DESCRIPTION OF THE INVENTION

Figure 1:
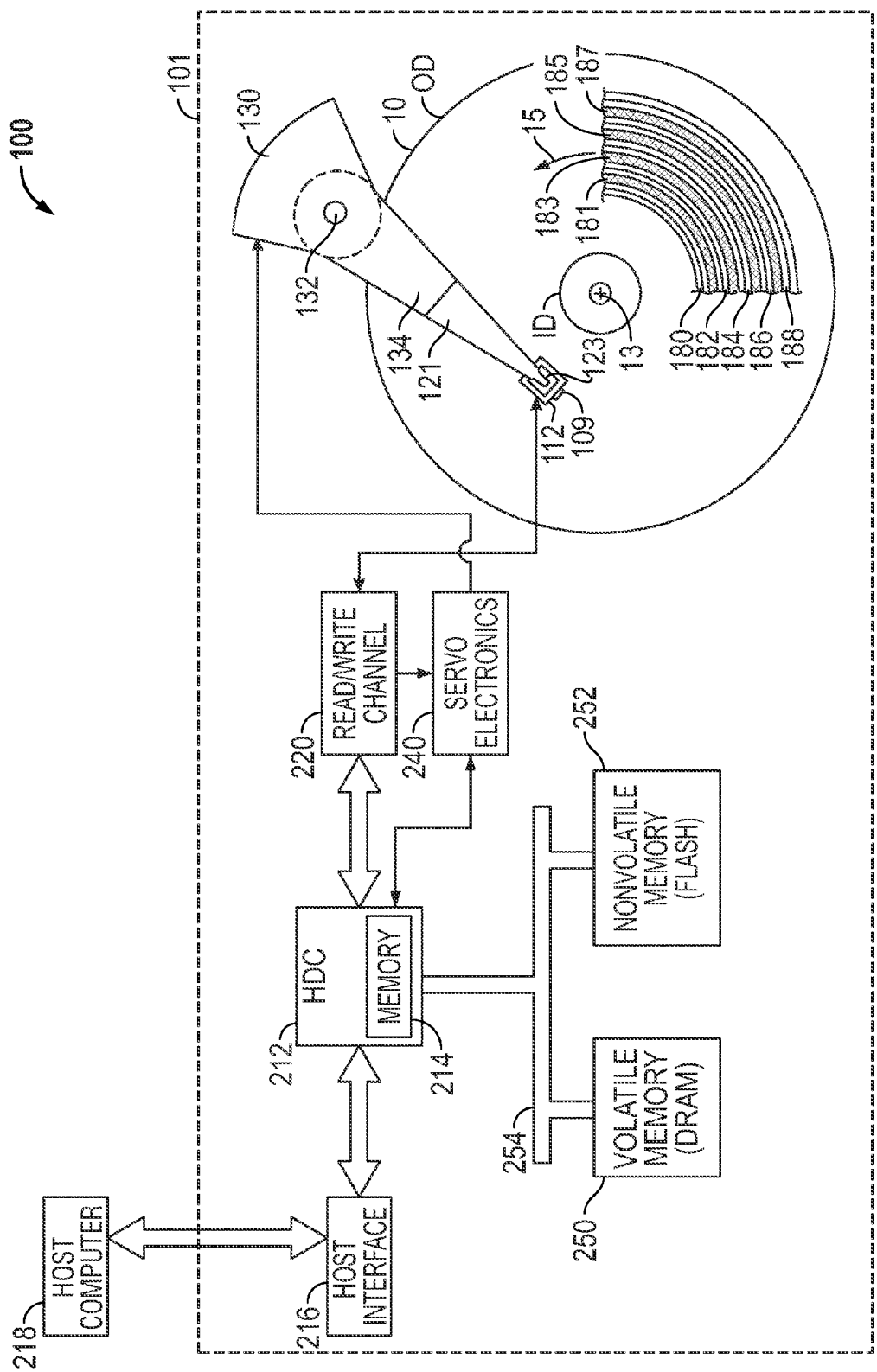
FIG. 1 is a top view of a SMR disk drive for use with the method according to the invention.

FIG. 1 is a top view of a disk drive 100 with shingled recording according to the invention. The disk drive has a housing or base 101 that supports an actuator 130 and a spindle motor (not shown) for rotating the magnetic recording disk 10 about its center 13 in the direction indicated by arrow 15. The actuator 130 may be a voice coil motor (VCM) rotary actuator that has a rigid arm 134 and rotates about pivot 132. A head-suspension assembly includes a suspension 121 that has one end attached to the end of actuator arm 134, a flexure 123 attached to the other end of suspension 121, and a head carrier, such as an air-bearing slider 122, attached to the flexure 123. The suspension 121 permits the slider 122 to be maintained very close to the surface of disk 10 and the flexure 123 enables the slider 122 to "pitch" and "roll" on an air-bearing generated by the rotating disk 10. The slider 122 supports the read/write or recording head 109 located on the end face 112 of slider 122. The recording head 109 is typically a combination of an inductive write head with a magnetoresistive read head (also called a read/write head). Only one disk surface with associated slider and recording head is shown in FIG. 1, but there are typically multiple disks stacked on a hub that is rotated by a spindle motor, with a separate slider and recording head associated with each surface of each disk.

In this invention the disk drive uses shingled magnetic recording (SMR), also called shingled writing. Thus FIG. 1 also illustrates portions of the circular shingled data tracks grouped as annular regions or bands on the recording layer of disk 10. Only portions of five bands 180, 182, 184, 186 and 188 are depicted, but there would typically be a large number of bands. Adjacent bands are separated by inter-band annular gaps, such as typical gaps 181, 183, 185 and 187. For example, for a 2.5 inch disk drive with shingled recording, the shingled data tracks may have a cross-track width (TW) of about 50 nm with each band containing several hundred tracks and with each gap separation between the bands being about 100 nm (or about 2 TW). In shingled recording the write head, which is wider than the read head in the cross-track direction, writes magnetic transitions by making a plurality of consecutive circular paths or tracks that partially overlap. The non-overlapped portions of adjacent paths or tracks form the shingled data tracks, which are thus narrower than the width of the write head. The data is read back by the narrower read head. When data is to be re-written in a shingled data track, all of the shingled data tracks that have been written after the track to be re-written are also re-written.

As is well known in the art, the data in each shingled data track in each of the bands is also divided into a number of contiguous physical data sectors (not shown). Each data sector is preceded by a synchronization (sync) field, which is detectable by the read head for enabling synchronization of reading and writing the data bits in the data sectors. Also, each shingled data track in each of the bands includes a plurality of circumferentially or angularly-spaced servo sectors (not shown) that contain positioning information detectable by the read head for moving the read/write head 109 to the shingled data tracks and maintaining the read/write head 109 on the tracks. The servo sectors in each shingled data track are typically aligned circumferentially with the servo sectors in the other shingled data tracks so that they extend across the shingled data tracks in a generally radial direction.

The disk drive 100 also includes a hard disk controller (HDC) 212 that can include and/or be implemented by a microcontroller or microprocessor. The controller 212 runs a computer program that is stored in memory 214 and that embodies the logic and algorithms described further below. The memory 214 may be separate from controller 212 or as embedded memory on the controller chip. The computer program may also be implemented in microcode or other type of memory accessible to the controller 212. The controller 212 is connected to a host interface 216 that communicates with the host computer 218. The host interface 216 may be any conventional computer-HDD interface, such as Serial ATA (Advanced Technology Attachment) or SCSI (Small Computer System Interface).

The electronics associated with disk dive 100 also include servo electronics 240. In the operation of disk drive 100, the read/write channel 220 receives signals from the read head and passes servo information from the servo sectors to servo electronics 240 and data signals from the data sectors to controller 212. Servo electronics 240 typically includes a servo control processor that uses the servo information from the servo sectors to run a control algorithm that produces a control signal. The control signal is converted to a current that drives actuator 130 to position the read/write head 109. In the operation of disk drive 100, interface 216 receives a request from the host computer 218 for reading from or writing to the data sectors. Controller 212 receives a list of requested data sectors from interface 215 and converts them into a set of numbers that uniquely identify the disk surface, track and data sector. The numbers are passed to servo electronics 240 to enable positioning read/write head 109 to the appropriate data sector.

The controller 212 acts as a data controller to transfer blocks of write data from the host computer 218 through the read/write channel 220 for writing to the disk 10 by the write head, and to transfer blocks of read data from the disk 10 back to the host computer 218. Disk drives typically include, in addition to the rotating disk storage, solid state memory (referred to as "cache") that temporarily holds data before it is transferred between the host computer and the disk storage. The conventional cache is dynamic random access memory (DRAM), a volatile form of memory that can undergo a significant number of write/erase cycles and that has a high data transfer rate. Disk drives may also include nonvolatile memory. One type of nonvolatile memory is "flash" memory, which stores information in an array of floating gate transistors, called "cells" which can be electrically erased and reprogrammed in blocks. Thus in disk drive 100, the controller 212 also communicates with volatile memory 250 (shown as DRAM) and optional nonvolatile memory 252 (shown as FLASH) via data bus 254.

Figure 2:
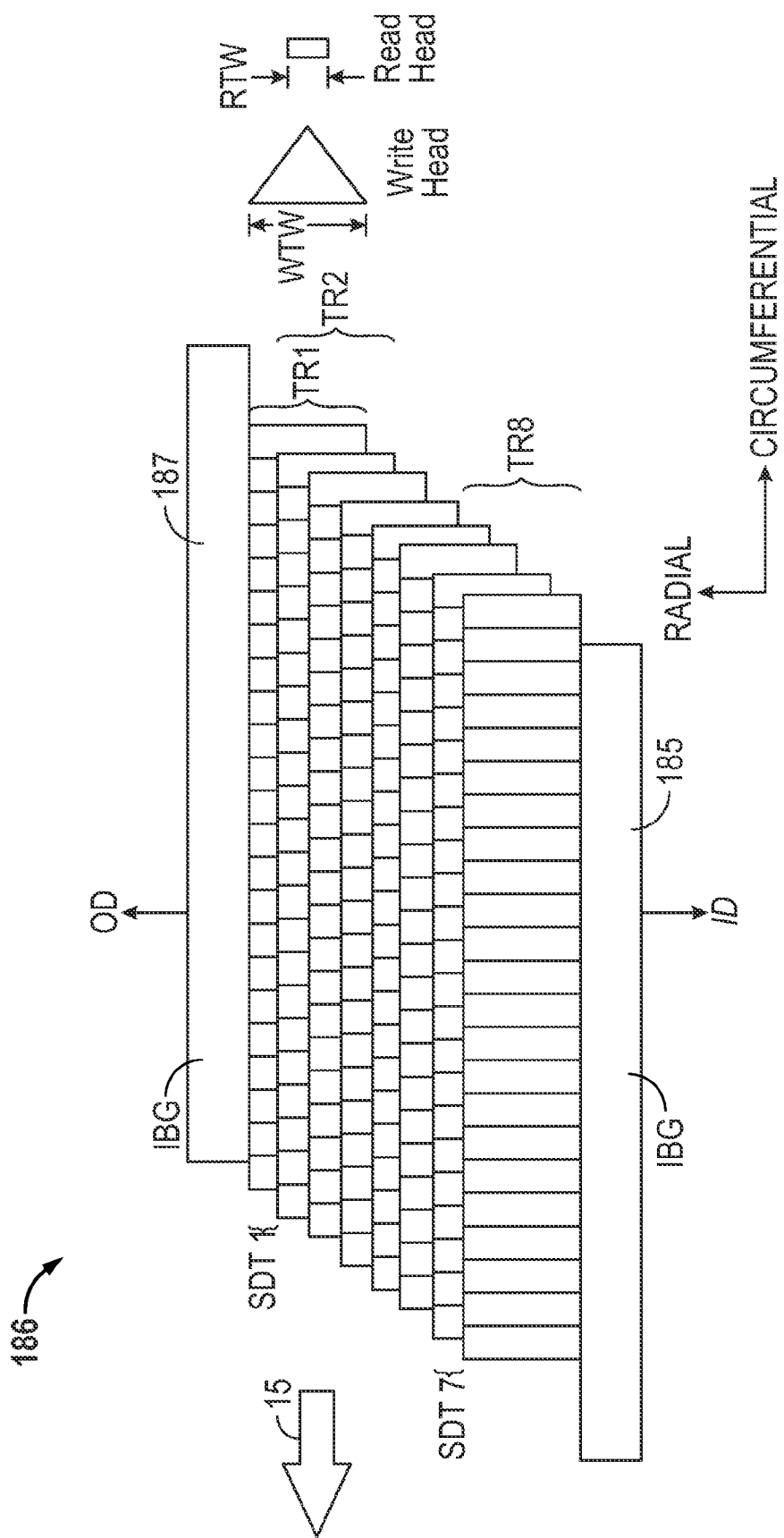
FIG. 2 is a schematic showing a typical band on a SMR disk and illustrates the multiple overlapping tracks that define the shingled data tracks.

FIG. 2 is a schematic of a shingled region or band, like band 186, for use in describing the method of SMR. A typical band will have a large number, i.e., several hundred or thousand, shingled data tracks (SDTs); however only 7 are shown in band 186 for ease of illustration. Band 186 has inter-band gaps (IBGs) 185, 187 that separate it from radially adjacent bands. The write head makes successive paths or tracks (TRs) to form the SDTs which, in the example of FIG. 2, are written in the direction from disk outside diameter (OD) to disk inside diameter (ID). The write pole tip of the write head has a cross-track width (WTW) that is wider than the sensing edge of the read head cross-track width (RTW). When writing data, the write head generates paths of magnetic transitions, represented by the vertical lines, as the recording layer moves in the direction of arrow 15. For example, the actuator positions the write head to write data along track 1 (TR1), then moves the write head to write data along track 2 (TR2). The writing of data along TR2 overwrites a portion of the previously written TR1 and thus "squeezes" the data of TR1 to thereby form the first shingled data track (SDT1). In the example of FIG. 2, the shingled data tracks are written in the direction from the disk OD to ID. However, a disk drive can be formatted such that writing of the shingled data tracks in one or more bands can be from ID to OD, with different bands being written in different directions.

In general, in SMR, whenever any portion of the data in an annular band is to be re-written or updated, all of the shingled data tracks in that annular band that were written after the shingled data track being updated are also re-written. The writing of data to an entire band may occur when new data from the host is stored in memory and then written to a band for the first time. It may also occur when a portion of the data in a band is modified, i.e., a "read-modify-write" operation in which all the data in a band is read and stored in memory, then a portion is modified with the host-provided new write data, and finally all the data is written data back to the band. The writing of data to an entire band or bands may also occur when a band or bands are "cleaned" or "de-fragmented" to reclaim free space, i.e., the data in one or more bands is read and stored in memory and then re-written to the same band or a new band.

A problem in both conventional HDDs and SMR HDDs is wide-area track erasure (WATER) or far track encroachment or erasure (FTE). The write field from the write head is wider than a data track so when the write head is writing to a track, the outer portions of the write field (called the fringe field) overlap onto tracks other than the track being written. The fringe fields can extend over a range of tracks relatively far from the track being written. FTE generally translates into an increase in bit error rate (BER), resulting in degradation of the performance of the disk drive. In some severe cases, poor BER will lead to a significant increase of unrecoverable data errors. FTE is particularly noticeable with write heads that have side shields. FTE may not affect tracks symmetrically on both sides of the track being written. Tracks on one side may encounter more pronounced FTE effects due to the write head shield design or due to read-write head skew. In a SMR disk drive, FTE can occur on the tracks in the boundary region of a band, i.e., those tracks near an inter-band gap, when data is written to tracks in the boundary region of an adjacent band.

In this invention variable incremented counting is performed for the shingled data tracks in the band boundary regions that are subjected to the FTE effect from writing to boundary regions in adjacent bands. The magnitude or extent of the FTE effect is determined for each track in a boundary region that is within a range of tracks of the track being written in the boundary region of an adjacent band, and based on the relative FTE effect for all the tracks in the range a count increment (CI) is determined. A count may be maintained for each track in a boundary region or a cumulative count maintained for all the tracks in a boundary region. In one implementation a counter is maintained for each of N tracks in each boundary region, where N is the track range of the effect of FTE from the write head. When data is written to one of the N tracks in a boundary region, the counters for the N tracks in the adjacent boundary region are increased by the predetermined increments based on the number of tracks from the track being written. When the count for any one of the N tracks of a boundary region reaches a predetermined threshold, the data in that band is rewritten. The data is rewritten before the FTE effects can build up, so the reliability of the data is improved. In another implementation, a single counter is maintained for each boundary region of N tracks. When data is written to one of the N tracks in a boundary region, the counter for the adjacent boundary region is increased by a predetermined cumulative increment based on the number of N tracks that are within the range of the track being written. When the cumulative count for a boundary region reaches a predetermined threshold, the data in that band is rewritten.

Figure 3:
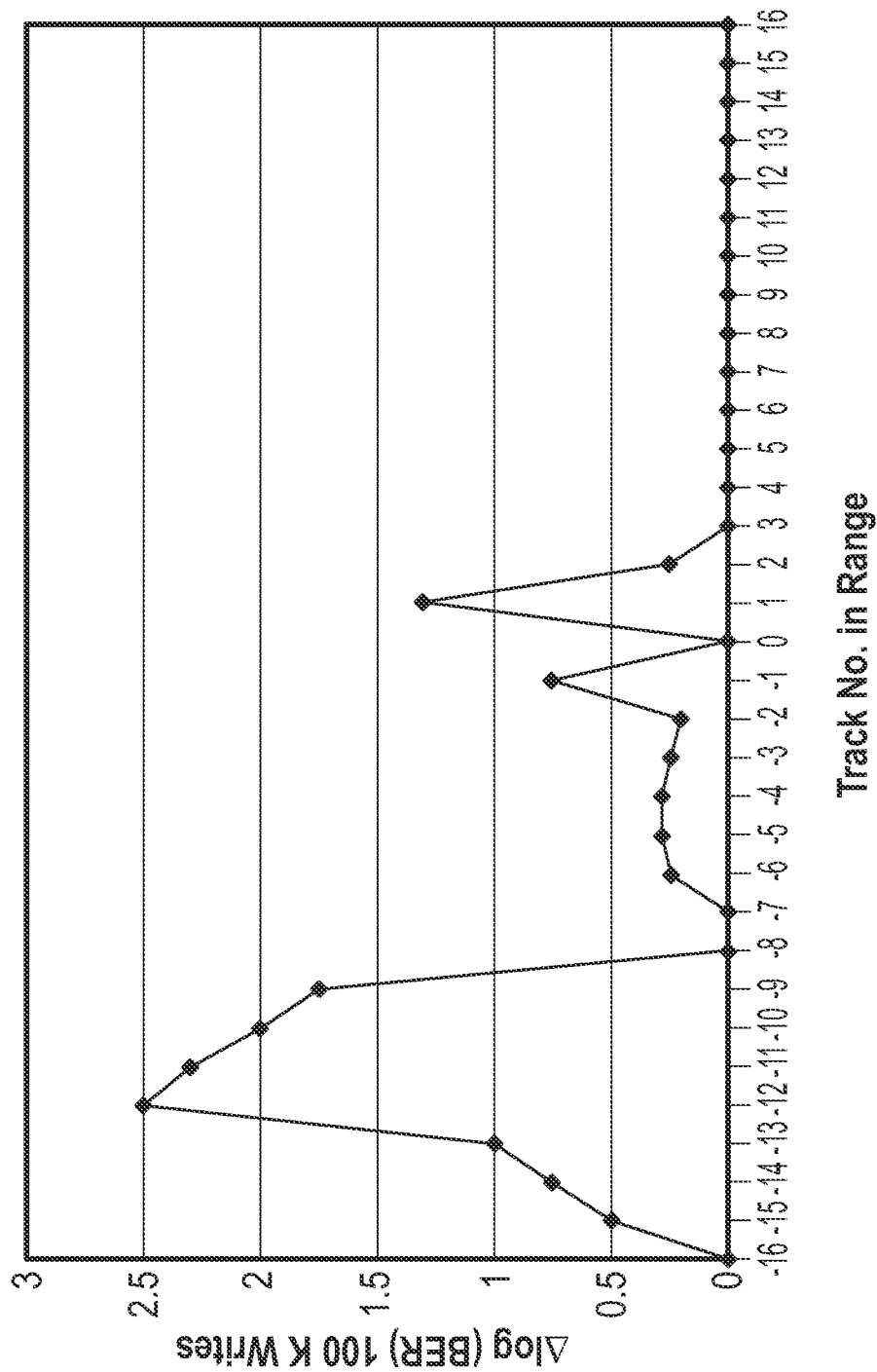
FIG. 3 is a graph of an example of measured bit error rate (BER) degradation values for a range of tracks written by a perpendicular recording head and illustrates the effect of far track erasure (FTE).

In one approach for determining the relative FTE effects on the tracks within a range of tracks of the track being written, the error rate is used to determine the count increments. A predetermined data pattern is written to all the tracks within a range of −N to +N tracks from a track (designated track 0). An initial "bit" error rate (BER) is then measured for each track in the range of 2N tracks. In one well-known approach for measuring BER, the HDD's error correction circuitry is deactivated, for example by setting to zero the value in the error correction register for the maximum number of errors to correct, and then the data pattern is read back and the number of bytes in error is counted. Since there must be at least one bit in error for each byte in error, this is the initial BER for each track in the range. Then track 0 is written a very large number of times (for example 100,000 writes). The BER is then again measured for all 2N tracks in the range. The degradation in BER is the difference between the measured BER after the writes to track 0 and the initial BER. FIG. 3 is a graph of measured BER degradation values for a range of 32 shingle data tracks written by a perpendicular write head. The y-axis of FIG. 3 is the difference in the logarithm of the measured BER after writes and the logarithm of the initial BER (Δ log (BER)). This graph shows the expected relatively large effect of the fringe fields at immediately adjacent tracks −1 and +1. The FTE effect is clearly shown by the high BER values for tracks −9 to −15, which are significantly higher than the BER values for tracks closer to track 0 (tracks −2 to −8). FIG. 3 also shows the unsymmetrical characteristic of FTE, with very low BER values for tracks between +2 and +16. From the measured BER degradation values, which represent the relative weightings of FTE for all the tracks within the range, a set of count increments can be calculated for all the tracks within the range. FIG. 4 is a table of shingled data track number (TR#), BER degradation value (logarithmic), and calculated count increment (CI) for 32 shingled data tracks within a range of −N to +N tracks (where N=16 in this example) for the perpendicular write head that produced the BER data of FIG. 3. In this example a Δ log (BER) of 0.75 is an arbitrary reference value (REF) and assigned a count increment of 1 (as shown by track −1). The count increments are then calculated for each track based on the BER degradation for that track. Because the BER values are logarithmic, a count increment (CI) is calculated for each track number (TR#) according to the following:

$$CI_{TR\#}=10^{[\Delta\ log(BER_{TR\#})-REF]}$$

Figure 5A:
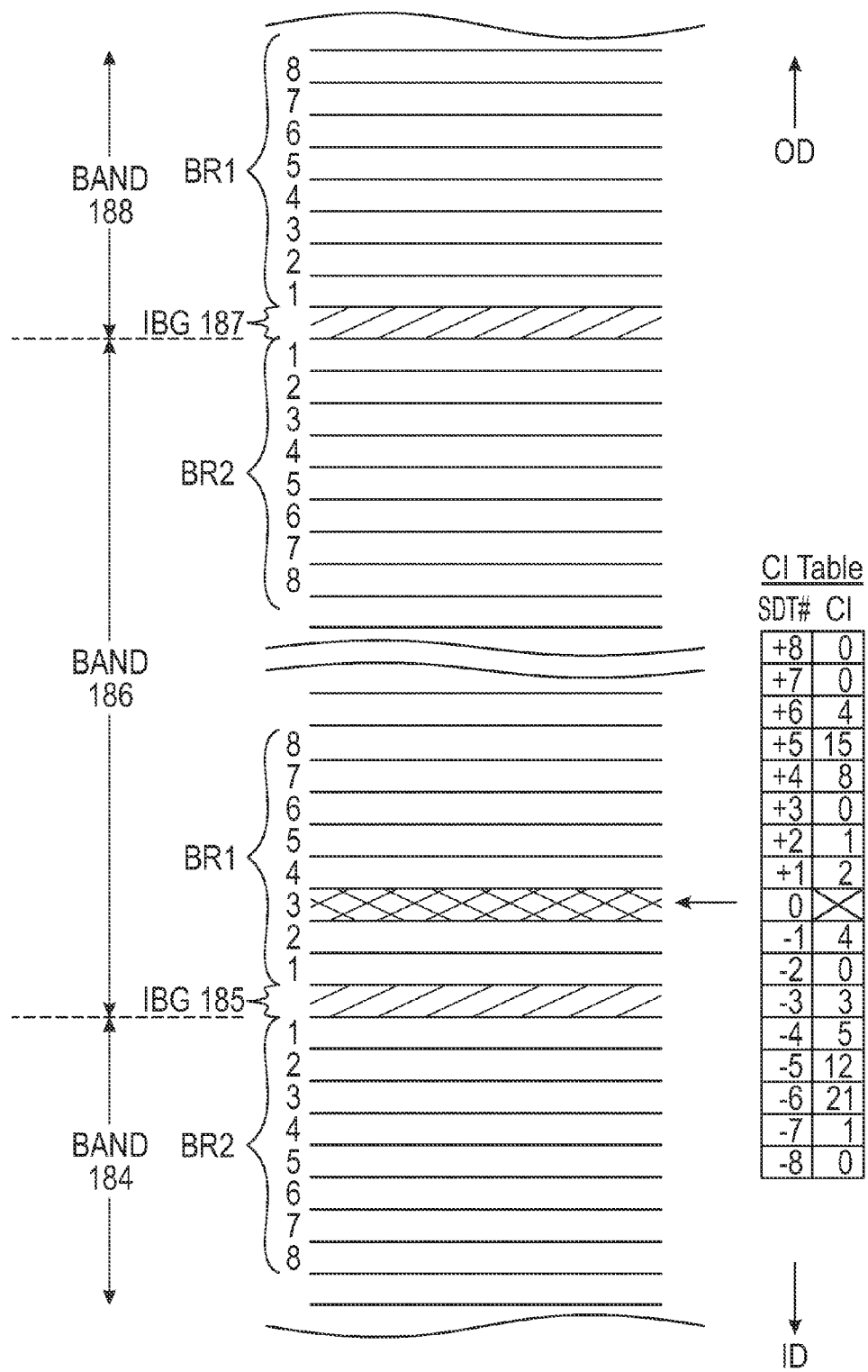
FIG. 5A is a schematic representation of a SMR disk showing three annular bands with inter-band gaps and band boundary regions and illustrating the count increment (CI) table aligned with a track being written in one of the band boundary regions.
Figure 5B:
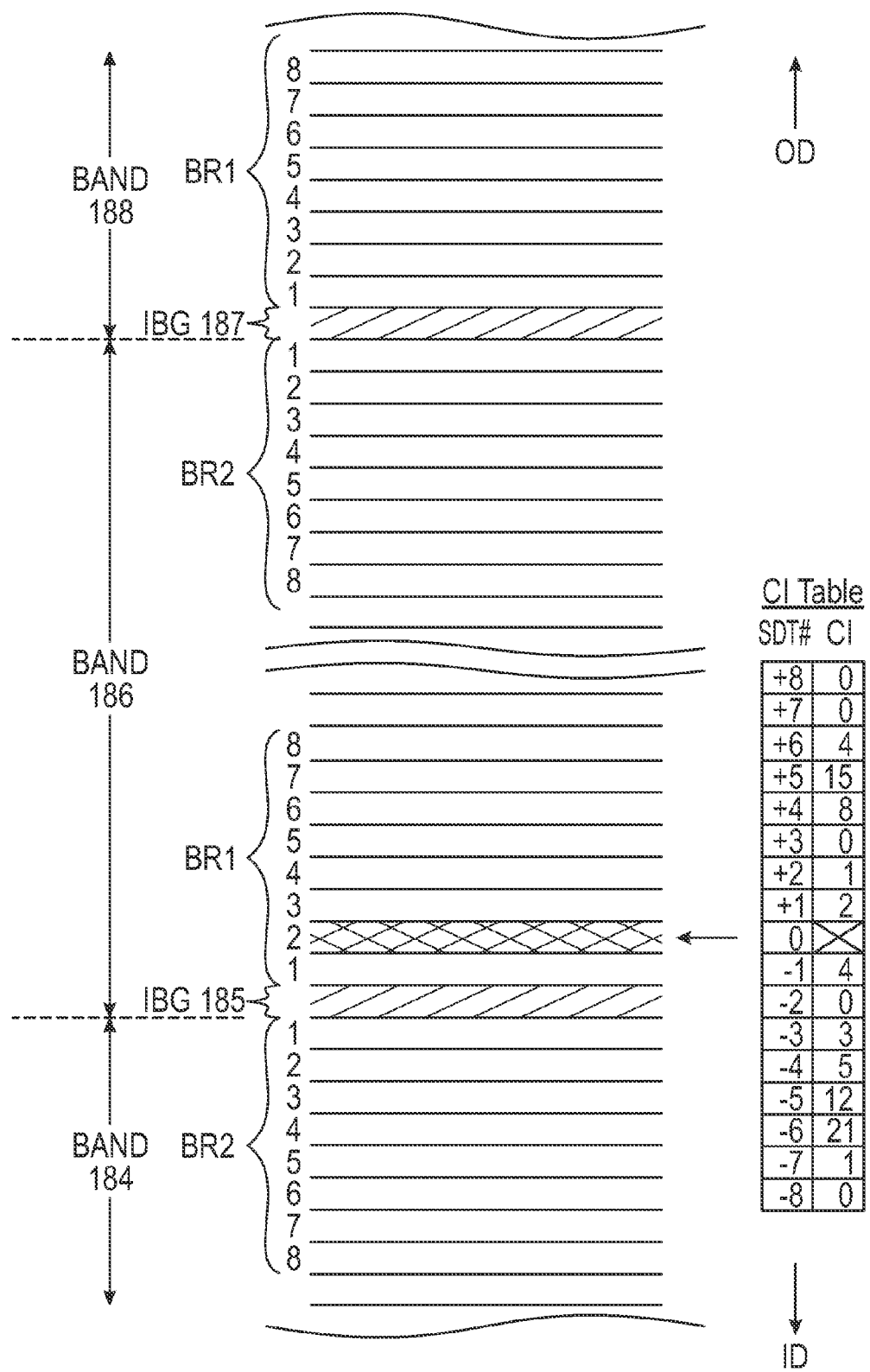
FIG. 5B is a schematic like FIG. 5A but illustrating the CI table aligned with a track being written that is one track shifted from the written track in FIG. 5A.

In this invention, for every writing to a data track in one of the N boundary region tracks, at least one count is maintained for the adjacent boundary region. The method of the invention will be explained with FIGS. 5A-5B. In one implementation a count is maintained for each track in a boundary region that is within N tracks of the track being written in the adjacent boundary region and each count is increased by its value of CI according to a table of CI values. In FIG. 5A, three annular bands 184, 186, 188 are depicted, with one-track wide inter-band gaps (IBGs) 185, 187. Each band has 2 boundary regions, BR1 at the ID side and BR2 at the OD side. In this example, the effect of FTE is from −8 tracks to +8 tracks, so N=8, a relatively small number for ease of illustration. In the example of FIG. 5A, track 3 in boundary region BR1 of band 186 is being written, as represented by the cross-hatching. Thus the center of the CI table is depicted to the right of this track being written. As shown, the range of N tracks from the track being written (track 3 in BR1 of band 186) extends only into tracks 1 through 5 in the adjacent boundary region, i.e. BR2 of band 184. Thus, for boundary region BR2 in band 184, the counters for tracks 1-5 would be incremented by 5, 12, 21, 1 and 0, respectively, based on the corresponding CI values in the CI table. FIG. 5B is identical to FIG. 5A, except that now the actuator has moved the write head towards the ID by one track and thus track 2 in boundary region BR1 of band 186 is being written. Thus the center of the CI table is now depicted to the right of the new track being written (track 2 in BR1 of band 186). As shown, the range of N tracks from the tracks being written now extends into tracks 1 through 6 in BR2 of band 184. Thus, for boundary region BR2 in band 184, the counters for tracks 1-6 would again be incremented, but this time by 0, 5, 12, 21, 1, 0, respectively, based on the corresponding CI values in the CI table. FIGS. 5A-5B are for an example where tracks in a BR1 (a boundary region on the ID side of a band) are being written, which causes FTE in a BR2 (a boundary region on the OD side of a band) in the adjacent band. This results in the use of CI values for the −N range (−1 to −8 SDTs) in the CI table. However, if tracks in a BR2 (a boundary region on the OD side of a band) are being written, for example tracks in BR2 of band 184, this would cause FTE in a BR1 (a boundary region on the ID side of a band) in the adjacent band, for example BR1 of adjacent band 186. This would result in the use of CI values for the +N range (+1 to +8 SDT#s) in the CI table.

During operation of the HDD, the controller (HDC 12 in FIG. 1), or another controller or microprocessor in the HDD, identifies the track number where data is being written, recalls from the table the CI values for each track within the range and increases the counters for each track within the range by the recalled CI values. The table and the counters are stored in memory associated with controller 12, for example memory 14, which may be embedded in controller 12, volatile memory 50 or nonvolatile memory 52. When the count value for a track in the boundary region of a band reaches a predetermined threshold (T) the data is read from that band and rewritten to the band. The value for T can be chosen based on several factors, including the known track density of the HDD, the intended purpose of the HDD, the desired reliability, and the BER of the HDD measured during manufacturing. Thus, depending on these factors, T may be chosen to be a relatively high value, for example higher than 10,000, or a relatively low value, for example less than several hundred. After the data has been rewritten to a band, the counter or counters are reset to 0.

In another implementation of the invention, a single cumulative count is maintained for each boundary region of each band and the cumulative count is incremented by a cumulative count increment (CCI) for each writing to a track in an adjacent boundary region. For example, in FIG. 5A, the FTE effect on tracks 1-5 of BR2 in band 184 due to the writing track 3 in BR1 of band 186 can be represented by a CCI corresponding to the sum of the CI values for these tracks. Thus for track 3 of a BR1 (a boundary region on the ID side of a band), CCI=5+12+21+1+0=39. Similarly, as shown in FIG. 5B, for track 2 of a BR1, CCI=3+5+12+21+1+0=42. A complete CCI table for the example of FIGS. 5A-5B is shown in FIG. 6. Thus the track number for the track being written in a boundary region is determined and the corresponding CCI value is recalled from the table and added to the cumulative count for the adjacent boundary. The CCI values are related to the number of tracks between the track being written and the adjacent boundary region and represent the cumulative effect of FTE on all the tracks within the range of the track being written. When the cumulative count value for a boundary region of a band reaches a predetermined threshold the data is read from that band and rewritten to the band. In this implementation only a single counter is required for a boundary region, i.e., only two counters for each band.

Because a HDD typically includes multiple disk surfaces, each with an associated read/write head, and because not all heads will have the same exact write profiles and thus not generate the same FTE effects, a table like that in FIG. 4 can be developed for each head and its associated disk surface. Also, because of head skew, the write profile and thus the FTE effect for a particular head may vary depending on the radial position of the head. Thus multiple tables like the table in FIG. 4 may be maintained for each head, depending on the radial position of the head.

The operation of the HDD as described above may be implemented as a set of computer program instructions stored in memory and executable by a processor, such as the HDC, or a separate controller or microprocessor in the HDD. The controller performs logical and arithmetic operations based on the program instructions stored in memory, and is thus capable of performing the functions described above and represented in the figures.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A shingled magnetic recording disk drive comprising:
a magnetic recording disk having a recording surface with a plurality of concentric shingled data tracks arranged in annular bands separated by annular inter-band gaps, each band having a boundary region of tracks adjacent a gap, whereby each gap is located between adjacent boundary regions;
a write head associated with said disk surface for generating a magnetic write field to write data to the data tracks;
a read head for reading data written in the data tracks;
a controller for controlling the writing of data by the write head to the data tracks; and
memory coupled to the controller and containing a program of instructions readable by the controller for minimizing the effect of encroachment of the write field on data tracks in a boundary region when a data track is being written in an adjacent boundary region, the program of instructions undertaking the method acts comprising:
 (a) maintaining in memory at least one count for each boundary region;
 (b) for each writing of data to a track in a boundary region, increasing said at least one count for an adjacent boundary region by a predetermined increment, said increment being determined from the number of tracks between the track being written and said adjacent boundary region; and (c) when a count reaches a predetermined threshold, reading the data from the band containing said threshold-count boundary region and rewriting the data read from said band.

2. The disk drive of claim 1 wherein there are N tracks in each boundary region and wherein maintaining in memory at least one count for each boundary region comprises maintaining a count for each of said N tracks.

3. The disk drive of claim 2 wherein step (b) comprises: for each writing of data to a track in a boundary region, increasing said at least one count for each of said N tracks in an adjacent boundary region by a predetermined increment, said increment being determined from the number of tracks between the track being written and the track whose count is being incremented.

4. The disk drive of claim 3 wherein the effect of encroachment of the write field on data tracks is within a range between −N tracks and +N tracks and further comprising a table in memory of 2N tracks having range numbers between −N and +N and corresponding 2N count increment values, and wherein the method act of increasing said at least one count for each of said N tracks in an adjacent boundary region by a predetermined increment includes determining the range number for each track within said range and recalling from the table in memory the corresponding count increment value.

5. The disk drive of claim 4 wherein each of the count increment values is related to a measured error rate for the corresponding track.

6. The disk drive of claim 1 wherein there are N tracks in each boundary region and wherein maintaining in memory at least one count for each boundary region comprises maintaining a cumulative count for each boundary region.

7. The disk drive of claim 6 wherein step (b) comprises: for each writing of data to a track in a boundary region, increasing said cumulative count for an adjacent boundary region by a predetermined cumulative count increment, said cumulative count increment being determined from which of the data tracks is being written.

8. The disk drive of claim 7 wherein the effect of encroachment of the write field on data tracks is within a range between −N tracks and +N tracks and further comprising a table in memory of 2N tracks having range numbers between −N and +N and corresponding 2N cumulative count increment values, and wherein the method act of increasing said cumulative count by a predetermined increment includes determining the track number for the track being written and recalling from the table in memory the corresponding cumulative count increment value.

9. The disk drive of claim 8 wherein each of the cumulative count increment values is related to the sum of the measured error rates for all the tracks within the range of the track being written.

10. The disk drive of claim 1 wherein the disk drive has a plurality of disk surfaces, each having a plurality of concentric data tracks, and associated write heads, and wherein the program of instructions comprises undertaking method acts (a) through (c) for each disk surface.

11. The disk drive of claim 1 wherein the memory is nonvolatile memory.

12. A magnetic recording disk drive comprising:
a rotatable magnetic recording disk comprising a substrate and a magnetic recording layer on the substrate;
a head carrier having a recording-layer-facing surface;
a write head on the head carrier, the write head generating a generally circular path of magnetic transitions in the recording layer as the disk rotates;
an actuator connected to the head carrier for moving the head carrier generally radially across the disk, the actuator being capable of moving the head in an increment less than the radial width of a path, whereby the write head generates partially overlapping generally circular paths of magnetic transitions, the non-overlapping portions of the circular paths representing data tracks, the data tracks being arranged in annular bands separated by annular inter-band gaps, each band having a boundary region of data tracks adjacent a gap, whereby each gap is located between adjacent boundary regions;
a read head on the carrier for reading written data from the data tracks;
memory coupled to the controller and containing a program of instructions readable by the controller for minimizing the effect of encroachment of the write field on data tracks in a boundary region when a data track is being written in an adjacent boundary region, the program of instructions undertaking the method acts comprising:
(a) maintaining in memory a cumulative count for each boundary region;
(b) maintaining in memory a table of track numbers between −N tracks and +N tracks and corresponding 2N cumulative count increment (CCI) values;
(c) for each writing of data to a track in a boundary region, determining the track number and recalling from said table the corresponding CCI;
(d) increasing said cumulative count by said recalled CCI for the boundary region adjacent the boundary region containing the track being written; and
(e) when said cumulative count reaches a predetermined threshold, reading the data from the band containing said threshold-count boundary region and rewriting the data read from said band.

13. The disk drive of claim 12 wherein each of the CCI values is related to the sum of the measured error rates for all the tracks within a range of N tracks of the track being written.

14. The disk drive of claim 12 wherein the disk drive has a plurality of disk surfaces, each having a plurality of data tracks, and associated write heads, and wherein the program of instructions comprises undertaking method acts (a) through (e) for each disk surface.

15. The disk drive of claim 12 wherein the memory is nonvolatile memory.

* * * * *